Figure 1:
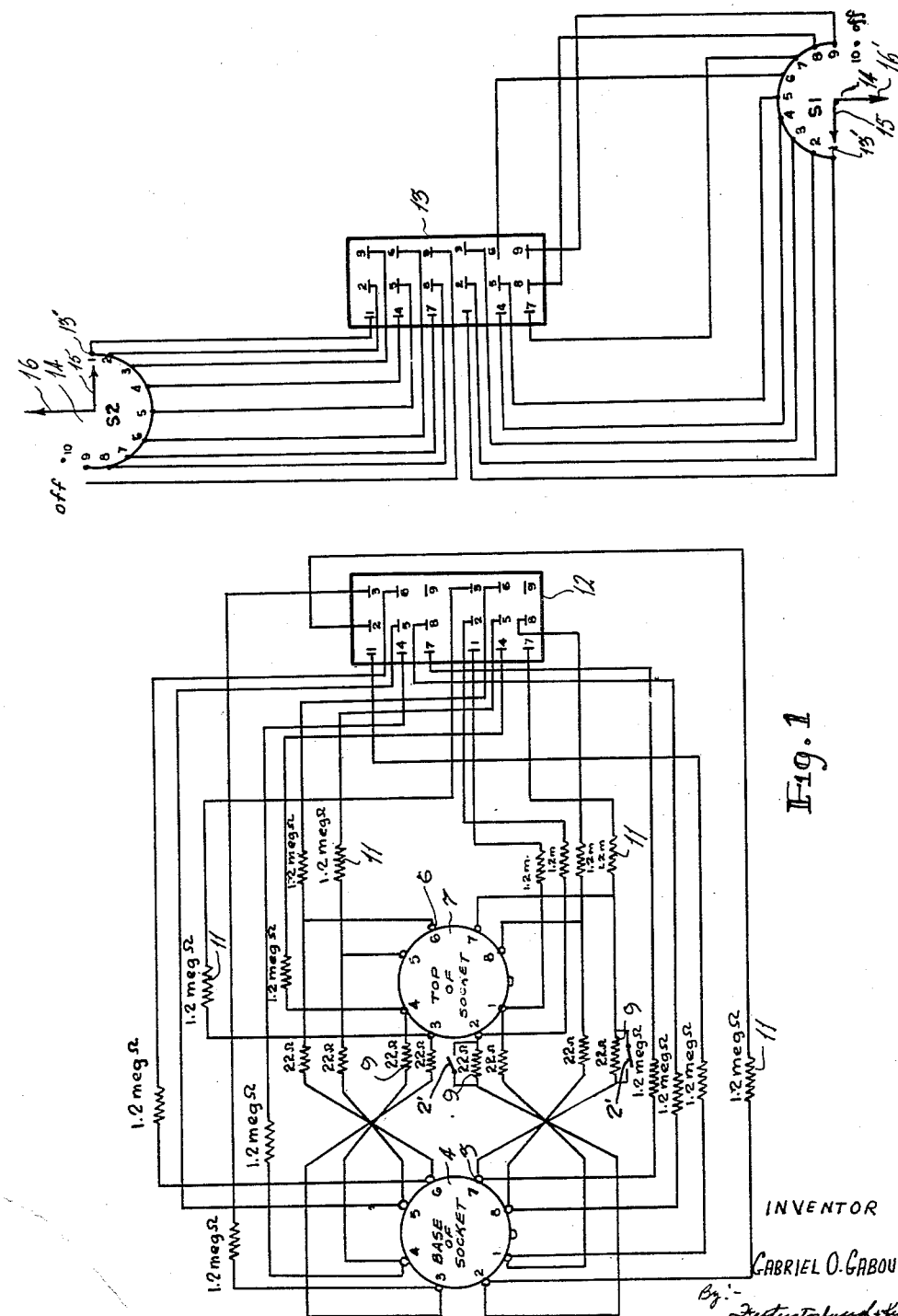

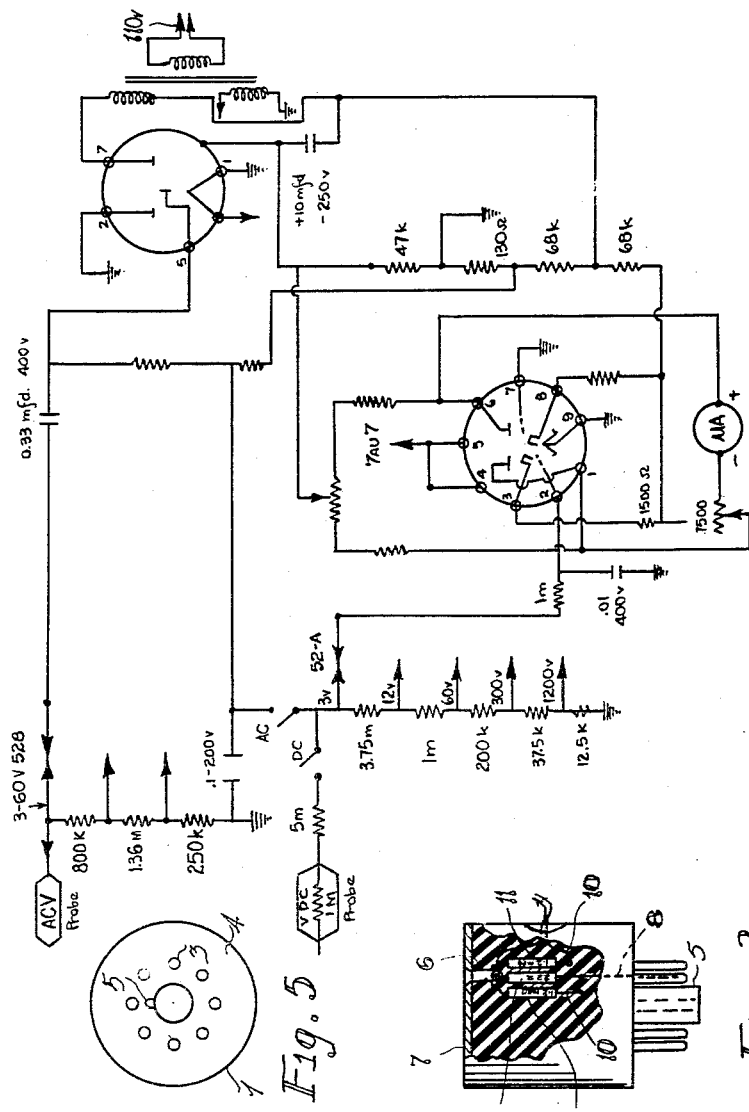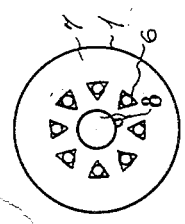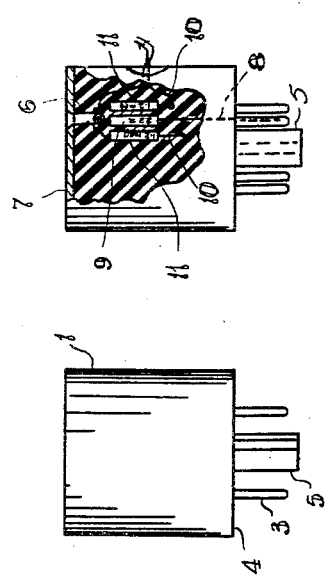
INVENTOR
GABRIEL O. GABOURY
By:-
Fetherstonhaugh & Kent
HIS ATTORNEYS

United States Patent Office 2,927,265
Patented Mar. 1, 1960

2,927,265
IN-CIRCUIT TUBE TESTER AND ANALYZER
Gabriel O. Gaboury, St. Boniface, Manitoba, Canada
Application July 15, 1957, Serial No. 671,751
11 Claims. (Cl. 324—23)

My invention relates to new and useful improvements to testing and analyzing apparatus adapted to be used with electronic tubes and cathode ray tubes and other circuits under operating conditions, the principal object and essence of my invention being to provide a device of the character herewithin described whereby an adaptor can be inserted within the tube socket and the tube itself inserted into the adaptor so that the electronic device can operate normally as the various elements and functions of the tube are analyzed.

Conventional tube testers or checkers suffer from the disadvantage that they cannot check the tubes in actual operating conditions without the tester itself affecting the characteristics thereof or, alternatively, they cannot be utilized without the use of probes or without removing a chassis from the cabinet.

My tester and analyzer overcomes these disadvantages inasmuch as the tubes can be checked in actual operating conditions and without the use of probes or unsoldering delicate parts.

A further object of my invention is to provide a device of the character herewithin described which utilizes a conventional vacuum tube volt meter to measure the voltage drop of an element of the tube, which is drawing current from the chassis, through the adaptor and translating this voltage drop into functional characteristics of the various elements. Furthermore, I provide means to de-couple the leads and the vacuum tube volt meter from the tubes being tested thereby isolating the tube from the impedance effect of the leads which would affect the functioning characteristics of the tube elements.

Yet another advantage of my invention is to provide a device of the character herewithin described which is extremely rapid and simple in operation inasmuch as by the rotation of two switches, and the plugging of a tube to be tested into my adaptor and plugging my adaptor into the corresponding socket of the tube, all voltages and current appearing at this tube can be read readily and easily.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a wiring diagram of my device.
Figure 2 is a side elevation of my adaptor plug.
Figure 3 is similar to Figure 2, but showing the adaptor plug sectioned in part to show the connections between the pin and socket thereof.
Figure 4 is a top plan view of my adaptor.
Figure 5 is a bottom plan view of my adaptor.
Figure 6 is a schematic view diagram of one embodiments of the meter.

Proceeding, therefore, to describe my invention in detail, reference should be made to the accompanying drawings and in particular Figures 2 and 3. I have provided a substantially cylindrical adaptor 1 consisting of a plurality of pins or plugs 3 on the lower ends thereof spaced radially around and extending from the underside base 4. Also provided is a key 5 to assist in positioning the pins in a conventional tube socket (not illustrated). The number of pins depends upon the type of tube being tested, but normally a 7, 8 or 9-pin adaptor will be required together with a cathode ray tube adaptor.

Each pin 3 has a corresponding socket 6 upon the upper surface 7 of the adaptor together with a recess 8 so that the upper surface can receive the pronged base of a conventional tube, the recess receiving the key of the tube so that when the adaptor is placed within the tube socket and the tube in turn is placed within the adaptor, the tube is in the correct operating position as usual.

Each pin 3 is connected to its corresponding socket 6 as shown in Figure 3. A lead 8 extends from the pin to the socket 6 and has incorporated therein, a 22 ohm resistor 9 so that the current of the tube being tested passes through this resistor with a corresponding minute voltage drop thereacross. A lead 10 extends from each side of the resistor 9 to externally of the socket, each of said leads having in series therewith a 1.2 megohm resistor 11 thus effectively de-coupling the leads from the tube under test.

Each pin, therefore, has two leads externally of the adaptor and these leads are conveniently cabled and terminate in a multi-pronged plug 12 conventionally known as a Jones plug. This cable can be shielded if desired in the conventional manner. This plug is adapted to be received into a corresponding plug 13 so that the adaptors can be connected and disconnected from the remainder of the apparatus as desired. Each of the leads 10 extends to corresponding terminals 13' in a pair of rotary single circuit multi-positional switches 14, the switching elements 15 of which in turn lead to a conductor or lead 16 and 16' which can be plugged into a conventional vacuum tube volt meter of the bridge network D.C. amplifier type having input impedences of not less than 11 megohms on A.C. or D.C. scales and its lowest range not greater than 1½ volt full scale deflection.

The values of the resistors 9 and the de-coupling resistors 11 have been chosen for a vacuum tube volt meter having an input impedence of 12 megohm and the minimum voltage rate of 1 volt and therefore can be termed as having matching values to the characteristics of the meter.

If, however, a more sensitive vacuum tube volt meter is used, we could lower the value of the resistors 9. Also if a vacuum tube volt meter of high input impedance (i.e. 25 megohm) is used, then the values of the de-coupling resistors 11 would be increased (i.e. 2.5 megohm).

Therefore, the impedance of the minimum voltage range of the meter will determine the values of the resistors 9 and 11.

From the foregoing it will be appreciated that by the rotation of the switches 14, the current or voltage of various elements and various characteristics of the tubes under load can be indicated on the vacuum tube volt meter.

Perhaps the most important feature of my device is that the current through any element of a tube (with the exception of the heater current which after all only requires a voltage check), can be determined or read off a pre-calibrated scale on a vacuum tube volt meter or an instrument designed for this purpose using the high impedance bridge network D.C. amplifier circuit normally used in a vacuum tube volt meter. Of course, the voltage of tube heater or filament can still be measured by this device if desired.

The extremely high sensitivity of the vacuum tube volt meter plus its very high input impedance permits the use of this adaptor. As hereinbefore described, the current of an electronic tube element being tested passes through the 22 ohm resistor 9 and the minute voltage drop across this resistor is coupled to the vacuum tube volt meter through 1.2 megohm resistors which in turn effectively de-couples the circuit under test leaving the tube under test operating as usual except in high impedance networks where a conventional vacuum tube volt meter would have likewise effected same.

The 22 ohm resistor is of such low value that it will seldom load the circuit or tube under test, nor affects its bias to any appreciable extent.

The output conduits or leads 16 and 16' extend via a shielded double conductor to the input of the vacuum tube volt meter, an example of which is shown in Figure 6, but as this is conventional circuitry it is not thought necessary to describe it in detail.

In operation, the tube to be tested is plugged into the adaptor and then the adaptor in turn is plugged into the tube circuit and the circuit switched on until it comes to operating characteristics. As an example, the characteristics or circuit of a typical pentagrid converter, a 6SA7, is given.

The heater connection pins numbered 2 and 7 will have shorting plugs across the 22 ohm resistor in this instance, or incorporate micro-switched 2' which can be actuated externally to shunt the 22 ohm resistor 9 in and out of the circuit as required. In this particular test the switches will be closed.

The cathode current is checked by rotating both of the switches to position number 6 thereby connecting the pin connections number 6 of the 6SA7 tube whereupon the current can be read off on the appropriate scale in the vacuum tube volt meter.

To measure the oscillator bias, one switch is rotated to position number 5 corresponding to pin 5 of the tube, leaving the second switch in the same position, i.e. position number 6.

By observing that the proper range and polarity is used while rotating the switches, the bias can be read direct from the appropriate scale on the vacuum tube volt meter.

Thirdly, to measure any voltage on any element, the element of one switch can be rotated to any corresponding pin connection number leaving the other switch in position number 6.

With the use of a conventional tube manual, any tube can, therefore, readily be checked by comparing the graphs or voltage ratings set up by the manufacturer.

As a further example, a 6W6GT tube could be checked as follows:

To check the cathode current, rotate both switches to position number 8 whereupon the vacuum tube volt meter checks the voltage drop across the 22 ohm resistor which in turn can be interpreted directly into milliamperes on the appropriate dial.

To check the grid to cathode voltage on this tube, one switch should be rotated to pin position 5 and the other switch to pin position 8.

In other words, any of the currents in any of the elements (with the exception of the filaments) can be checked by rotating the rotary switches to the same number as the pin connection found in base diagrams of a tube manual.

Furthermore, A.C. voltage or current can be checked using the same procedure except that appropriate A.C. ranges would have to be used on the vacuum tube volt meter. Hence, the circuit components as well as the characteristics of the tube under test can be analyzed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An in-circuit tube tester and analyzer comprising in combination an adaptor plug, prongs on one end of said adaptor plug adapted to engage the tube circuit of the tube being tested, sockets on the other end of said adaptor adapted to receive the prongs of the tube under test, a pair of single circuit multi-positional switches, a lead extending from each prong on said adaptor to one circuit on one of said switches, a further lead extending from each socket of said adaptor to a correspondingly numbered circuit on the other of said switches, means in each of said leads to de-couple the circuits being tested from said switches, a connection between each corresponding prong and socket of said adaptor, a resistance in series with said connection and a meter having a high impedance bridge network D.C. amplifier circuit switchably in circuit with said switches adapted to measure the voltage drop across said resistor.

2. The device according to claim 1 which includes switch means in said adaptor to shunt the series resistor of the filament pins of said adaptor as desired.

3. The device according to claim 2 in which the values of said resistance and said de-coupling means match the characteristics of said meter.

4. An in-circuit tube tester and analyzer comprising in combination an adaptor plug, prongs on one end of said adaptor plug adapted to engage the tube socket of the tube being tested, sockets on the other end of said adaptor adapted to receive the prongs of the tube under test, a meter having a high impedance bridge network D.C. amplifier circuit, in-circuit with said adaptor, selectively engageable switch means extending between each of said prong and socket of said adapter and said meter, resistance means between each prong and socket, and de-coupling means in circuit between each prong and socket and said meter.

5. The device according to claim 4 which includes switch means in said adaptor to shunt the series resistor of the filament pins of said adaptor as desired.

6. The device according to claim 5 in which the values of said resistance and said de-coupling means match the characteristics of said meter.

7. The device according to claim 4 in which the values of said resistance and said de-coupling means match the characteristics of said meter.

8. An in-circuit tube tester and analyzer comprising in combination an adaptor plug, a pair of rotary multi-positional single circuit switches, and a meter having a high impedance bridge network D.C. amplifier circuit, and circuit means connecting said adaptor through said switches to said meter, said adaptor plug including a plurality of prongs on the base thereof adapted to be inserted into the socket of the tube being tested, a plurality of sockets corresponding to said prongs, on the upper side of said adaptor and adapted to receive the pronged end of the tube being tested, each of said prongs being connected to its corresponding socket via a resistor, leads extending from each side of said resistor to corresponding positions on each of said rotary switches, and de-coupling means in said leads whereby the impedance of said leads does not influence the function of the tube being tested, said meter adapted to indicate the voltage drop across said resistor.

9. The device according to claim 8 which includes switch means in said adaptor to shunt the series resistor of the filament pins of said adaptor as desired.

10. The device according to claim 9 in which the values of said resistance and said de-coupling means match the characteristics of said meter.

11. The device according to claim 8 in which the values of said resistance and said de-coupling means match the characteristics of said meter.

References Cited in the file of this patent

UNITED STATES PATENTS

| | | |
|---|---|---|
| 1,928,345 | Wisman | Sept. 26, 1933 |
| 2,088,355 | Wehming | July 27, 1937 |
| 2,186,184 | Tubbs | Jan. 9, 1940 |
| 2,632,358 | Ehat | Mar. 24, 1953 |
| 2,823,304 | Shiels | Feb. 11, 1958 |

FOREIGN PATENTS

| | | |
|---|---|---|
| 695,292 | Great Britain | Aug. 5, 1953 |